United States Patent [19]

Engelsmann et al.

[11] 4,269,492
[45] May 26, 1981

[54] PHOTOGRAPHIC CAMERA WITH SINGLE SELECTOR STRUCTURE PERFORMING EXPOSURE-PARAMETER ADJUSTMENT AND ALSO SWITCHING OF CONTROL AND MONITORING CIRCUITS

[75] Inventors: Dieter Engelsmann, Unterhaching; Rolf Schröder, Baldham, both of Fed. Rep. of Germany

[73] Assignee: AGFA-Gevaert, A.G., Leverkusen, Fed. Rep. of Germany

[21] Appl. No.: 20,329

[22] Filed: Mar. 14, 1979

[30] Foreign Application Priority Data

Sep. 24, 1978 [DE] Fed. Rep. of Germany ....... 2841648

[51] Int. Cl.³ .......................... G03B 1/18; G03B 17/38
[52] U.S. Cl. ........................................ 354/42; 354/59; 354/60 L; 354/173; 354/289
[58] Field of Search .................. 354/27, 32, 42, 53, 354/59, 60 R, 603, 60 L, 139, 149, 171, 173, 289, 127, 128; 200/16 R, 16 C, 160

[56] References Cited

U.S. PATENT DOCUMENTS

| 3,784,765 | 1/1974 | Daly | 200/16 D X |
| 3,786,206 | 1/1974 | Kurimsky | 200/16 D |
| 4,005,460 | 1/1977 | Mizukawa | 354/289 |
| 4,142,788 | 3/1979 | Matsumoto et al. | 354/60 E X |
| 4,160,588 | 7/1979 | Beach | 354/60 L X |

FOREIGN PATENT DOCUMENTS

| 1941752 | 2/1971 | Fed. Rep. of Germany . | |
| 2333020 | 1/1975 | Fed. Rep. of Germany | 354/149 |
| 2713913 | 10/1977 | Fed. Rep. of Germany | 354/289 |

Primary Examiner—L. T. Hix
Assistant Examiner—William B. Perkey
Attorney, Agent, or Firm—Michael J. Striker

[57] ABSTRACT

A selector slide is manually displaced by the user from an inoperative setting to a series of operative settings for adjusting exposure-aperture size. When the selector slide leaves inoperative setting, it closes a main power-connect switch connecting the camera's various circuits to the camera battery. The selector slide is provided with a pushbutton which the user depresses to initiate various control or test functions, some of which are performed only in certain settings of the selector slide, others of which are performed within all settings to which the user might move the slide in the course of adjusting aperture size, or another exposure parameter. Examples of such functions are activating a user-oriented scene-light-sufficiency indicator circuit and a circuit which indicates the state of the camera battery. Certain settings of the selector slide are reserved for flash-exposure use, and in these settings the user employs the slide to select subject-distance, and thereby indirectly the exposure-aperture size; in the flash-exposure settings, the slide also closes an enablement switch which readies a flash unit for operation. In this way, essentially only the slide and the pushbutton on it can be used to vary exposure parameters, select operating modes and exposure-parameter values appropriate for such modes, and also initiate test or monitoring operations. Preferably, a single conductive spring contact, slid by the slide and depressed by the pushbutton, engages a plurality of contact strips in varying combinations depending upon the setting of the slide and whether or not the pushbutton is depressed, to cause such contact strips, in their various combinations, to act as various combinations of electrical switches.

12 Claims, 2 Drawing Figures

PHOTOGRAPHIC CAMERA WITH SINGLE SELECTOR STRUCTURE PERFORMING EXPOSURE-PARAMETER ADJUSTMENT AND ALSO SWITCHING OF CONTROL AND MONITORING CIRCUITS

BACKGROUND OF THE INVENTION

The present invention concerns photographic cameras of the type provided with a selector member employed by the user to adjust at least one exposure parameter, such as exposure-aperture size and/or exposure duration, etc., and furthermore also employed by the user to activate at least one electrical switch whose activation effects at least one further control or test operation.

SUMMARY OF THE INVENTION

It is a general purpose of the present invention to very fully develop the extended use of such an exposure-parameter adjuster so that the user of a camera provided with such an adjuster finds himself in the position whereby he can use essentially only this adjuster to control not only selection of an exposure-parameter value but at least a number of various switching functions attendant to at least a number of various control and/or monitoring operations of the camera, in the extreme version of which a sizable fraction of all user-controlled or user-adjusted functions, especially those involving electrical circuitry although not these exclusively, can be controlled by manipulation of what is essentially only a single adjuster structure.

It is another object of the invention to provide an exposure-parameter selector structure well suited for the needs of the object stated above.

In accordance with one concept of the present invention, the exposure-parameter selector structure is displaced by the user in a first manner for manual adjustment of the value of an exposure parameter, such as exposure-aperture size, and in a second manner to close or open various switches and thereby initiate and/or enable various camera control and/or test functions, some of these switches closing or opening only in a predetermined settings of the exposure-parameter selector structure, others closing or opening within more than one respective setting of the exposure-parameter selector structure.

Thus, in the embodiment of the invention disclosed herein, for example, when a selector slide is in an inoperative end position, the main power-connect switch for the camera's battery is open, and the power-connect switch closes merely in the course of moving the selector slide to any of its various adjusting and special-function positions. When the selector slide is in any of the settings reserved for flash exposures, the slide is used to select a subject distance and thereby indirectly an exposure-aperture size appropriate for such subject distance, and furthermore to close an enablement switch which readies the camera's flash unit for operation. When the selector slide is in the range of settings used to adjust aperture size for non-flash exposures the slide also serves to close, in addition to the main power-connect switch, a switch actually connecting to the camera battery the camera's aperture-size evaluating circuit, or another such exposure-parameter evaluating circuit if a parameter other than aperture size is involved, and furthermore within this range of non-flash settings of the slide depression of a pushbutton which rides on the slide triggers the indication of an exposure-parameter error indication indicating, for example, the direction in which the slide itself ought to be moved. By bringing the slide to a further, special-purpose setting, the user can effect the performance of at least one special function, such as a battery-condition check, preferably requiring him also to press the aforementioned pushbutton as he brings the slide to such setting.

In this way, although manual activation by the user may be required to enable and/or implement the various functions involved, as in much prior art, this is done by the user employing what is essentially a single multipurpose selector structure.

When the concept of the present invention is employed, it necessarily follows that a considerable amount of the user's attention will, in general, be directed to the multi-purpose selector structure used by him to control a variety of functions. Accordingly, the concept of furthermore attaching to the multi-purpose selector structure the main battery-connect action for the camera's various circuits becomes a particularly meaningful one. For example, one conventional practice is to provide the camera with a separate manual power-connect switch for internal circuits, which the user must per se switch on and off, and another conventional practice is to associate partial depression of the shutter trigger button with the power-connect action for at least one of the camera's internal circuits. A problem with the former expedient is of course that the user may forget to switch off the power-connect switch when the camera is no longer to be used; a problem with the latter expedient is that of inadvertent triggering of the shutter when the user is not yet actually ready to initiate an exposure. In accordance with the inventive concept in question, the main battery-connect action is afforded by moving an exposure-parameter adjuster to a predetermined inoperative position. Thus, if the user has manually adjusted the value of such parameter, performed the exposure, and wishes to put the camera away, to effect battery-disconnect he must return the exposure-parameter adjuster to its inoperative position. Such an approach to the battery-connect problem is particularly meaningful when, as already stated, the exposure-parameter adjuster will anyway be receiving a major portion of the user's attention, on account of its various and multiple uses. However, even where the exposure-parameter adjuster is devoid of extensive further control functions, e.g., as in the case of an ordinary aperture-size adjuster ring of the type most familiar, the concept of correlating the main battery-connect action with the setting of an exposure-parameter adjuster is of considerable interest, i.e., certainly as an alternative to the use of an entirely separate manually flipped battery-connect switch, and likewise as an alternative to reliance upon partial-depression of the shutter trigger button to effect the requisite battery-connect action.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
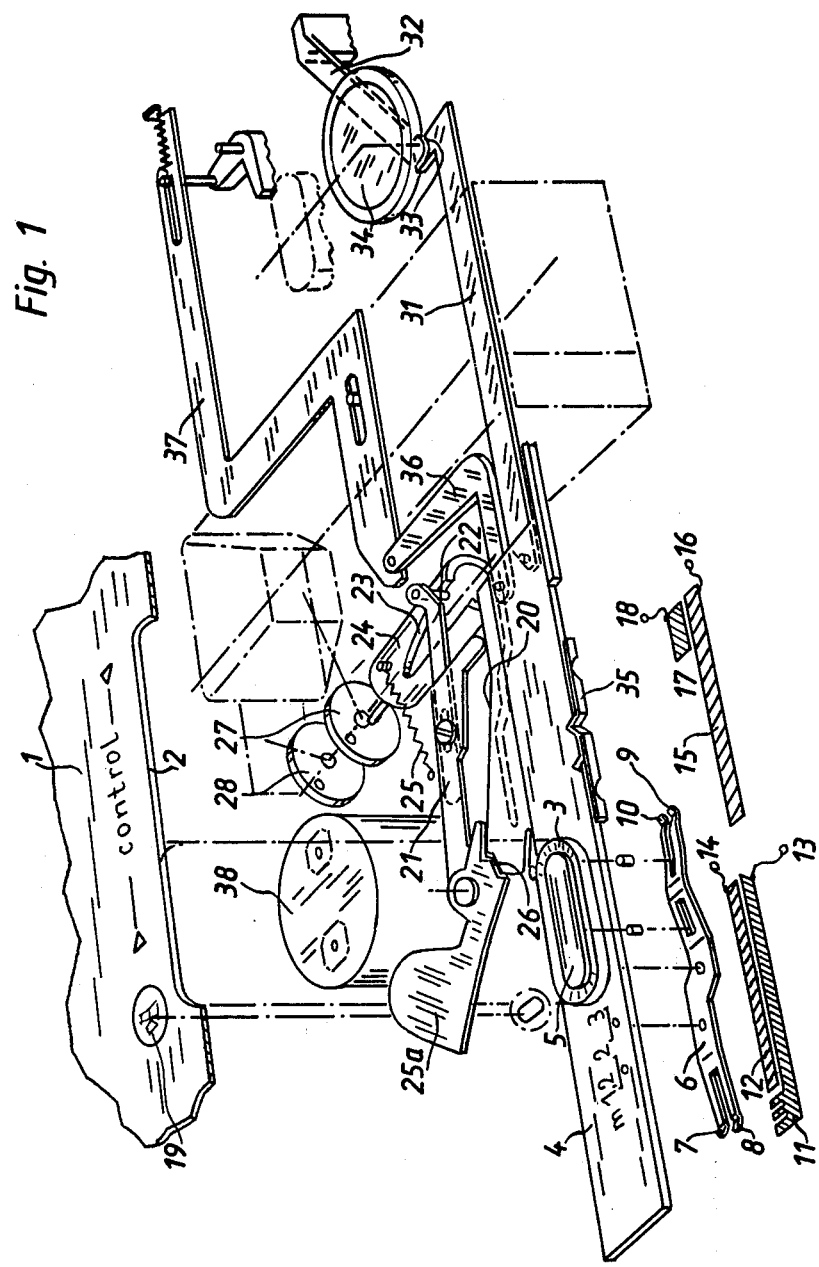
FIG. 1 is a perspective view of the mechanical part of a presently preferred, but merely exemplary embodiment of the invention.

In FIG. 1, numeral 1 denotes part of the upper face of the housing of a photographic camera. Housing 1 is provided with an elongated cut-out 2, up through which projects a generally oval member 3 manually engaged by the user and carried on a lengthwise slidable elongated slide 4. The manually engaged member 3 is annular and surrounds a pushbutton 5 also of generally oval shape, pushbutton 5 being movable within manually engaged member 3 in the direction perpendicular to the direction in which manually engaged member 3 can be shifted.

A generally harness-shaped spring contact member 6 is located below slide 4 and is secured through slide 4 to the pushbutton 5, first so that spring contact member 6 slide as slide 4 slides, and second so that when pushbutton 5 is depressed the right portion of spring contact member 6 likewise be depressed. The resilience of spring contact member 6 is additionally drawn upon to provide a spring biasing force which returns pushbutton 5 to its undepressed position when the user lets go of button 5. Spring contact member 6 is provided with four contact portions 7, 8, 9 and 10.

When slide 3, 4 is in its illustrated leftmost position, the two contact portions 7, 8 are both in conductive engagement with a stationary conductive strip 11. The shape of spring contact member 6 is such that contact portions 7, 8 bear down upon conductive strip 11 without the need for the user to depress pushbutton 5. This leftmost position of slide 3, 4 is its starting or inoperative position. When slide 3, 4 is manually shifted rightwards out of its inoperative position into one of its operative positions, contact portion 7 begins to ride in conductive engagement upon a stationary contact strip 12, as a result of which a conductive connection becomes established between the terminal 13 of contact strip 11 and the terminal 14 of contact strip 12. In a manner described below, the two terminals 13, 14 are employed as an electrical switch.

The contact portions 9 and 10 of spring contact member 6 are located to be engageable with respective ones of two further contact strips 15, 17, but are not normally at an elevation resulting in such engagement and must be pressed down into conductive engagement with such strips by depression of pushbutton 5.

For all operative positions of slide 3, 4 depression of pushbutton 5 results in the establishment of conductive engagement between the terminal 16 of contact strip 15 and the terminal 13 of contact strip 11. In a manner described below, the two terminals 13 and 16 are employed to constitute a further electrical switch.

When slide 3, 4 is in its rightmost end position, depression of pushbutton 5 causes contact portion 10 to conductively engage contact strip 17, thereby establishing an electrical connection between the terminals 16, 18 of the two contact strips 15, 17. The two terminals 13 and 16 are employed in this embodiment to constitute a still further electrical switch. Actually, if slide 3, 4 is in its rightmost end position and pushbutton 5 is depressed, conductive engagement of all four terminals 13, 14, 16, 18 to one another results, in the illustrated exemplary embodiment.

The upper part of camera housing 1 is provided with a small viewing window 19, preferably accommodating a small lens. Located behind the viewing window 19 is the indicium "O", which in a manner described below is visible through window 19 only when the slide 3, 4 is in its leftmost or inoperative position. The appearance of such "O" in window 19 informs the user that the camera's battery is unconnected to the circuits powered by it, in the illustrated exemplary embodiment.

The rear edge (as viewed in FIG. 1) of slide 4 is provided with a camming surface 20 which controls the angular position of a horizontally pivotable follower lever 21. Connected to follower lever 21 is a lever extension 22 at the end of which there depends a pin which tracks along the camming surface 23 of a small cam drum 24 mounted for rotation about a horizontal axis. A tension spring 25 urges the small cam drum 24 counterclockwise, and thereby maintains engagement between lever extension 22 and camming surface 23, and likewise between follower lever 21 and camming surface 20.

At its left end, follower lever 21 carries a covering blade 25a mounted for horizontal swinging movement. A (non-illustrated) biasing spring normally maintains blade 25a in a position covering the indicium "O" so that the latter not be visible through viewing window 19 when slide 3, 4 is in any of its operative positions. When slide 3, 4 is moved to its leftmost, inoperative position, a control projection 26 on it displaces blade 25a to unblocking position, so that the "O" be visible in window 19. Preferably, the upper face of covering blade 25a is colored red or another conspicuous color, so that a glance at the window 19 will inform the user whether the slide 3, 4 is in inoperative position.

Figure 2:
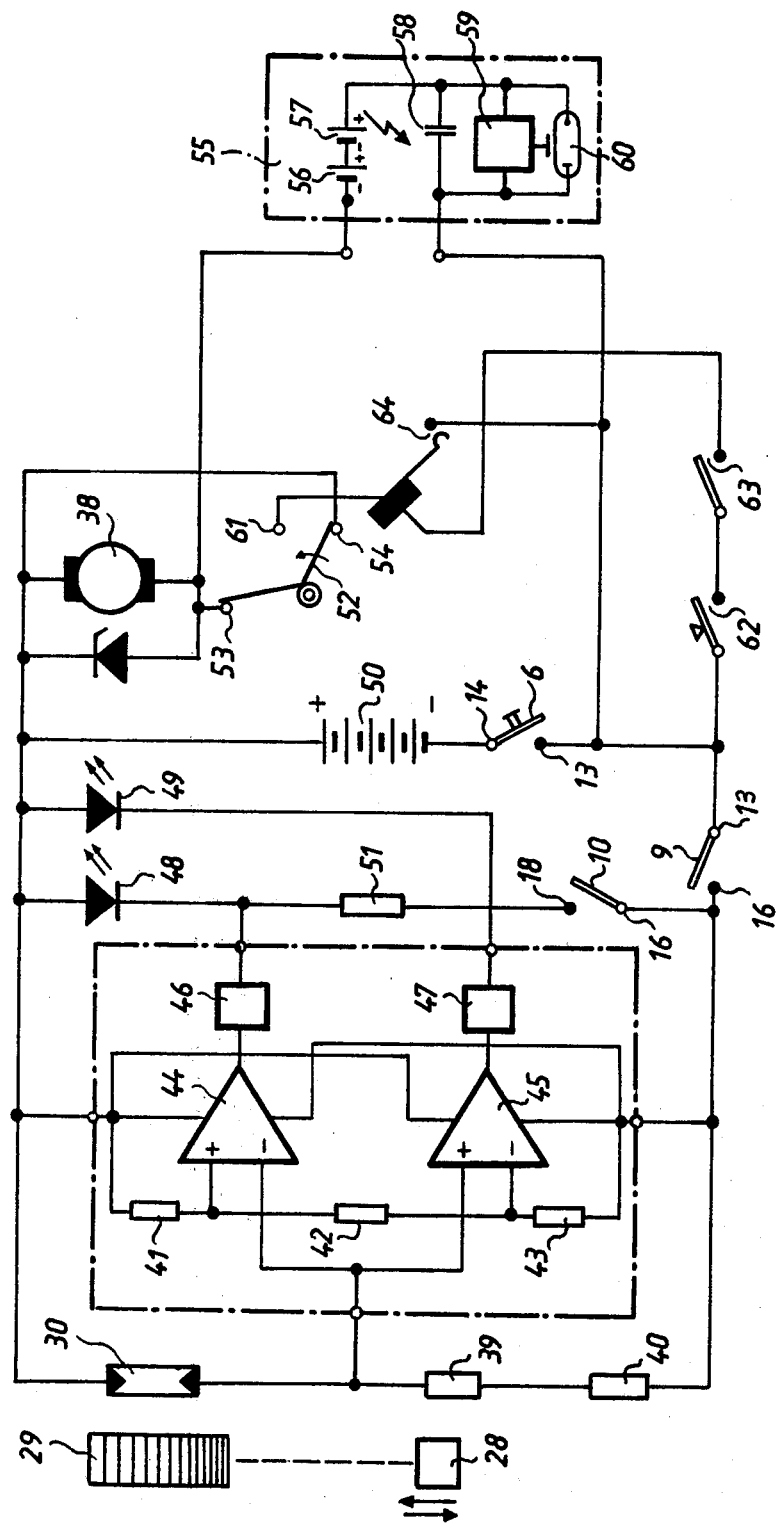
FIG. 2 depicts circuitry cooperating with the mechanical part of the embodiment shown in FIG. 1.

The small cam drum 24 serves to adjust the size of the camera's (non-illustrated) exposure aperture. In particular, rotation of drum 24 effects rotation of two control cams 27, 28. Control cam 27 is coupled, in per se conventional manner, to the camera's exposure-aperture diaphragm and adjusts its size in dependence upon the angular position of drum 24. Control cam 28 is coupled, likewise in conventional manner, to a further, simulator diaphragm located in front of a photosensitive element 30, shown in FIG. 2. In FIG. 2, the simulator aperture 29 has the form of an optical filter of progressively varying transmittance, positioned in front of photosensitive element 30, and operative, under the action of control cam 28, for varying the fraction of incident light actually reaching element 30 in simple correspondence to the size of the exposure aperture established by control cam 27.

Slide 4 is provided at its right end with an extension 31 at the right end of which is a blocking projection 33. Numeral 32 denotes a trigger lever which, when depressed due to depression by the user of an elastic-diaphragm trigger button 34, triggers performance of an exposure. When slide 3, 4 is in its leftmost, inoperative position, blocking projection 33 is located in the path of movement of the trigger lever 32, thereby preventing the triggering of an exposure. As slide 3, 4 is shifted rightwards out of its leftmost, inoperative position, it sets the camera's exposure aperture and also the aperture simulator 29 to progressively smaller sizes, starting from maximum aperture. A first part of the range of movement of slide 3, 4 is associated with flash-lamp exposures. For example, there may be two distinct flash-lamp-exposure settings, established by a springy detent 35 engaging notches on the side of the slide 4 and used only when a lamp exposure is to be made. In the illustrated embodiment, there is pin-and-slot coupled to slide 4 a lever or link 36 which is in turn articulately coupled to the left end of an angled slider 37 operative, when slide 4 has been moved to one of its flash-lamp-exposure settings, for performing functions attendant to flash-lamp exposures. Chief among these functions is that slide 36 closes a switch connected in the current path of the camera's flash unit, e.g., a power-connect switch connected between the circuitry of the flash unit and the camera's battery or the flash unit's own battery if it comes as a removable attachment provided with a battery of its own. Slide 36 can also implement other flash-related functions, such as modifying the impedance in the current path of the flash unit's timer, etc.

Numeral 38 denotes an electric motor used to transport film and to rewind or reset the camera's shutter mechanism, after the shutter has been triggered to perform an exposure.

In the exemplary circuit depicted in FIG. 2, the photoresistor 30 is connected in series with two resistors 39, 40 to form a light-dependent voltage divider having a tap intermediate elements 30 and 39. A second or reference voltage divider is constituted by resistors 41, 42 and 43. The voltage-divider tap intermediate photoresistor 30 and resistor 39 is connected to the inverting input of an operational amplifier 44 and to the non-inverting input of an operational amplifier 45. The voltage-divider tap between resistors 42 and 43 is connected to the inverting input of operational amplifier 45. Connected to the outputs of the two operational amplifiers 44, 45 are the inputs of respective threshold stages 46, 47, whose outputs are connected to the cathodes of respective light-emitting diodes 48, 49, the anodes of these diodes being connected to the positive terminal of the camera's battery 50. When the size of the camera's exposure aperture is too small, one of the two LED's 48, 49 lights up, and when too large the other LED lights up, to indicate to the user the direction in which he should manually shift slide 3, 4 to establish the correct exposure-aperture size. To this end, the two LED's 48, 49 can be configured, or located behind apertures configured, as arrows and be located or visible in the camera's viewfinder, to inform the user as directly as possible of the sense of the exposure-aperture error.

The negative terminal of the camera's motor battery 50 is permanently connected to terminal 14 of contact strip 12. When slide 3, 4 is shifted rightwards out of inoperative position, it conductively connects terminal 14 to terminal 13 of contact strip 11, the spring contact member 6 in this respect acting as the main power-connect switch for the camera's control circuitry.

Provided that manual slide 3, 4 is not in its leftmost, inoperative setting, depression of pushbutton 5 will at least cause contact portion 9 of spring contact member 6 to electrically engage contact strip 15, thereby electrically connecting strip terminal 16 to strip terminal 13. As shown at 9 in FIG. 2, this has the result that the illustrated light-responsive circuitry located to the left of battery 50 becomes operatively connected to the battery. Thus, depression of pushbutton 5 with the slide 3, 4 not in inoperative position, activates the light-responsive circuitry, and one or the other of the two LED's 48, 49 then lights up to indicate the direction in which slide 3, 4 ought to be moved to correct the aperture-size error, and if the aperture error is zero both LED's 48, 49 light up (or alternatively, neither of them).

The user can perform a test of battery condition by first shifting slide 3, 4 all the way to its rightmost end position and then depressing pushbutton 5, whereupon contact portion 10 of spring contact member 6 will engage contact strip 17 as contact portion 9 engages contact strip 15, thereby connecting together the two strip terminals 16, 18. As shown at 10 in FIG. 2, this action serves to connect, directly across battery 50, the series connection of one LED 48 and a test resistor 51. The resistance of test resistor 51 is selected high enough so that the voltage across and current flowing through LED 48 will be sufficient to light up LED 48, only if the battery 50 has enough remaining capacity to perform the functions to which the test relates; principally, such test would, for example, serve to ascertain whether the remaining capacity of battery 50, although perhaps sufficient for the scene-light indicator circuitry, is furthermore sufficient for energization of motor 38, motor 38 serving to transport film and rewind or reset the camera's shutter mechanism after each exposure.

For the purposes of explanation, motor 38 is assumed to be a film-transport and shutter-resetting motor, e.g., such as forms part of the film-transport and camera-control mechanism disclosed in commonly owned, copending application Ser. No. 939,374 filed Sept. 5, 1978, now U.S. Pat. No. 4,202,616. When the user depresses the camera release button 34, such mechanism becomes triggered, an elongated control rod is spring-driven in a first direction tripping the shutter in the process, whereupon the elongated control rod becomes coupled to and driven by the motor in the opposite second direction back to its starting position, at which point it decouples from the motor, the rod rewinding the shutter mechanism in the course of its second-direction stroke. Reference may be had to the application just identified for details of such a mechanism. In the present instance, and for explanatory purposes only, it is only the electrical switches cooperating with such mechanism which are of interest, and only these are shown in FIG. 2.

Numeral 62 denotes a switch which closes when the user depresses trigger button 34, and stays closed only so long as the user maintains trigger button 34 depressed. Closing of switch 62 does not, in itself, energize transport motor 38, but instead merely prepares the motor-energization circuitry for energization.

Numeral 63 denotes a switch which closes when, subsequent to the pressing down of trigger button 34, the camera's shutter mechanism has performed both an opening and then a closing movement; i.e., switch 63 closes after the camera's shutter mechanism has fully converted from its triggerable set state to its unset state in which it must be reset before it again becomes triggerable.

Numeral 64 denotes a centrifugal switch which closes when motor 38 reaches full operating speed. When centrifugal switch 64 is open, a stationary contact 64 is connectable to the negative terminal of battery 50 only via switches 62 and 63, so that with motor 38 at a standstill or at a speed lower than full operating speed, motor 38 can be energized only if both of switches 62 and 63 are closed. When centrifugal switch 64 is closed, stationary contact is connected to the negative terminal of motor battery 50 directly, i.e., not through the intermediary of switches 62 and 63, so that one or both of these latter two switches can open without discontinuing motor operation.

Numeral 52 denotes a changeover switch having two settings, in one of which motor 38 is short-circuited, and in the other of which the lower terminal of motor 38 is connectable via contact 61 to the negative terminal of battery 50. Here, the changeover switch 52 is depicted as a two-legged torsion-spring contact, the left leg of which permanently bears against a stationary contact 53, and the right leg of which engages either a stationary contact 54 (to short-circuit motor 38) or else the aforementioned contact 61 (to connect motor 38 to the negative battery terminal). In particular, changeover switch 52 begins to engage contact 61, to enable motor 38 to be energized after the camera's shutter has converted from set to unset state and needs to be reset. After the motor 38 has reset the camera's shutter mechanism, it continues to operate until the completion of a one-frame film-transport movement, and at the end of such movement a perforation feeler typically enters into the perforation of the next film frame, in response to which changeover switch 52 moves back into engagement with contact 54, thereby disconnecting motor 38 from power and furthermore short-circuiting it for the sake of a quick braking action.

Numeral 55 denotes the flash unit of the camera. Flash unit 55 comprises two batteries 56, 57 of its own, a storage capacitor 58, and a conventional control circuit 59 for firing and possibly also quenching a flash tube 60. Storage capacitor 58 charges off batteries 56, 57 irrespective of the setting of changeover switch 52. Capacitor 58 additionally charges off of motor battery 50, but only when changeover switch 52 is in the setting thereof short-circuiting motor 38. When changeover switch 52 is in its illustrated setting, connecting the lower terminal of motor 38 to the negative terminal of camera battery 50, capacitor 58 is prevented from charging off of battery 50, so that the load current drawn by flash unit 55 at such time not interfere with proper operation of motor 38, and vice versa.

In particular, when motor 38 is running during film-transport and/or shutter-resetting operations, the upper input terminal of flash unit 55 is connected to the negative terminal of battery 50, via contact 53, switch member 52 and contact 61. The lower input terminal of flash unit 55 is likewise connected to the negative terminal of battery 50, via terminals 13 and 14. With both the upper and the lower input terminal of flash unit 55 connected to the negative terminal of battery 50, the battery 50 is not connected across the input terminals of the flash unit, and accordingly the flash unit cannot draw current from battery 50. At the same time, however, both input terminals of flash unit 55 are conductively connected together, i.e., both being connected to the negative terminal of battery 50, so that storage capacitor 58 is connected directly across flash-unit batteries 56, 57 and can accordingly be charged off the latter.

Although, as illustrated, the flash-unit batteries 56, 57 become directly connected across storage capacitor 58 when motor 38 is in short-circuited state, it will be understood that the flash unit 55 might be of the type in which a voltage source is not directly connected across a storage capacitor but instead across the input terminals of a D.C.—D.C. converter having an output connected across the storage capacitor, in which case the short-circuited state of motor 38 would be associated with such a mode of connection. Likewise, it will be understood that the flash unit 55 may not be provided with batteries 56, 57 of its own, especially if unit 55 is a built-in unit and not a removable attachment; in that case, flash unit 55 would draw current exclusively when motor 38 is not running. Especially in the case of a built-in flash-lamp unit, the slide 37 of FIG. 1, as already stated, is advantageously employed to close an electrical switch, e.g., in the operating-voltage line of control stage 59, to ready the flash unit for operation when manual slide 3, 4 is shifted to one of its flash-exposure settings.

In the illustrated, exemplary embodiment, the shifted position of manual slide 3, 4 rather directly adjusts exposure-aperture size, via the small cam drum 24. It will be understood, however, that the position of manual slide 3, 4 could also be employed to adjust the subject-distance setting of the camera's exposure objective. Likewise, manual slide 3, 4 could also be used to adjust exposure duration, by varying the impedance of the time-constant stage of an exposure-duration control circuit, either directly in the electrical sense or indirectly in the case of photoelement-controlled timing circuits by modifying the amount of light incident upon the timing circuit's photoelement. The illustrated uses of manual slide 3, 4, although presently preferred, will be understood to be examples of such uses.

It will be understood that each of the elements described above, or two or more together, may also find a useful application in other types of constructions differing from the types described above.

While the invention has been illustrated and described as embodied in a control mechanism and circuit which adjusts exposure-aperture size and commands certain specified control and monitoring operations, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a photographic camera of the type provided with a film-transport system including an electric film-transport motor, in combination, means for adjusting an exposure parameter of the camera, including a manually displaced multi-setting exposure-parameter selector member manually displaced by the user for adjusting the value of at least one camera exposure parameter and having an inoperative setting and a series of operative settings, and motor-control circuit means including at least a first and a second electrical switch connected in the circuit path of the film-transport motor such that both must be closed to effect motor energization, and means responding to displacement of the selector member from its inoperative to any of its operative positions by closing the first electrical switch without closing the second electrical switch.

2. In a photographic camera having a pair of terminals for an electrical power supply, motor driven film transport means, electrically controlled exposure indication means and a checking circuit, in combination, a manually operated actuating structure including means for setting camera exposure parameters and electrical switch means having a main switch for said motor and for said exposure indication means, said setting means comprising a manually operated control member assembled of a plurality of control parts, a first control part being manually displaceable from a rest position into at least one working position and being operable independently from the other control parts in any adjusted position of said setting means to adjust at least one of said parameters, said main switch including a contact spring coupled to said first control part for joint movement therewith and defining four contact arms; two pairs of contact tracks successively arranged in the path of movement of said first control part, the first and the second contact arm cooperating with the first pair of said contact tracks to bridge the same when said first control part is moved toward said working position, one track of said first pair of tracks being electrically connected to one terminal of said power supply means, and the other track in said first pair of tracks being electrically connected to the motor, one track in said second pair of tracks being electrically connected to said exposure indication means, the third contact arm cooperating with a second control part to engage said one track in said second pair of tracks when said first part is in said working position, and the other track in said second pair of tracks being electrically connected to said checking circuit and being engageable with said fourth arm when said first control part overrides said working position.

3. In a camera as defined in claim 2, the second part being a pushbutton depressible into the first part.

4. In a camera as defined in claim 2, the first part being a longitudinally displaceable slide member.

5. In a camera as defined in claim 4, the second part being a pushbutton provided on the slide member and depressible into the slide member.

6. In a photographic camera, in combination, means for adjusting exposure parameters of the camera, including a multi-setting exposure-parameter selector structure manually displaced by the user for adjusting the value of at least one camera exposure parameter and comprising two manually contacted parts, the first manually contacted part being manually displaced by the user for adjusting the value of the at least one exposure parameter and the second part moving with the first part when the first part is thusly displaced, the second manually contacted part furthermore being displaceable by the user relative to the first manually contacted parts; and electrical switch means responsive to manual displacement of the second manually contacted part relative to the first manually contacted part, the camera including battery terminals for connection to a battery, the electrical switch means comprising a spring contact member mounted to share the manual displacement of the first manually contacted part and having a plurality of contact portions, and a plurality of contact strips located to be engageable by different ones of the contact portions of the spring contact member depending upon the manually displaced setting of the first manually contacted part, the plurality of contact strips including a first contact strip permanently connected to one battery terminal and a second contact strip, the first and second contact strips being located to be engaged and conductively connected together by at least one contact portion of the spring contact member only when the first manually contacted part is displaced from a predetermined inoperative position, the first and second contact strips together forming a first electrical switch, furthermore including a third contact strip located to be conductively engaged by a contact portion on the spring contact member and thereby become conductively connected to the second contact strip when the second manually contacted part of the selector structure is manually displaced relative to the first part thereof, the second and third contact strips together forming a second electrical switch, furthermore including a fourth contact strip located to be conductively engaged by a contact portion on the spring contact member and thereby become conductively connected to at least one of the first, second and third contact strips when the second manually contacted part of the selector structure is manually displaced relative to the first part thereof but only when the first manually contacted part has been manually displaced to a predetermined position, the fourth contact strip and said at least one of the first, second and third contact strips together constituting a third electrical switch.

7. In a camera as defined in claim 6, the first manually contacted part being a longitudinally slidable generally annular part, the second manually contacted part being a pushbutton surrounded by the annular first part and depressible into the first part, the camera having a housing provided with an elongated slot out through which the first and second manually contacted parts project.

8. In a camera as defined in claim 6, furthermore including test circuit means connected to the third electrical switch and operative when the third electrical switch is closed for performing a test operation.

9. In a camera as defined in claim 8, the test circuit means comprising means operative for measuring the condition of a battery connected to said battery terminals.

10. In a camera as defined in claim 8, the camera being of the type comprising a film-transport mechanism including an electric film-transport motor having a motor current path, the first electrical switch being connected in the motor current path.

11. In a camera as defined in claim 8, furthermore including a control circuit connected to at least one of the first and second electrical switches and operative when the second electrical switch is closed for generating a signal indicating as a function of sensed scene light the error in an exposure parameter of the camera.

12. In a camera as defined in claim 11, the control circuit including a light sensor exposed to scene light, the selector structure being operative for adjusting the size of the camera's exposure aperture and for furthermore varying the amount of light incident upon the light sensor, the control circuit furthermore including two indicators and circuit means connected to the indicators and to the light sensor and operative for causing one of the two indicators to provide an indication when the exposure aperture is too large for the prevailing scene light and the other indicator to provide an indication when the exposure aperture is too small, whereby said indications are provided only when the second manually contacted part of the selector structure is manually displaced relative to the first part thereof, the control circuit furthermore including test circuit means connected to the third electrical switch and operative when the second manually contacted part is manually displaced relative to the first part for connecting at least one of the indicators to the battery terminals to provide an indication of the state of a battery connected to the battery terminals.

* * * * *